(12) United States Patent
Baehmann et al.

(10) Patent No.: US 7,998,303 B2
(45) Date of Patent: Aug. 16, 2011

(54) METHOD FOR ASSEMBLING JOINTED WIND TURBINE BLADE

(75) Inventors: Peggy Lynn Baehmann, Glenville, NY (US); Thomas Miebach, Ballston Spa, NY (US); Eric John Telfeyan, Guilderland, NY (US); Wendy Wen-Ling Lin, Niskayuna, NY (US); Chandra Sekher Yerramalli, Nishayuna, NY (US); Shu Ching Quek, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 217 days.

(21) Appl. No.: 12/474,261

(22) Filed: May 28, 2009

(65) Prior Publication Data

US 2010/0132884 A1    Jun. 3, 2010

(51) Int. Cl.
| | |
|---|---|
| B29C 65/00 | (2006.01) |
| B32B 37/00 | (2006.01) |
| C09J 5/00 | (2006.01) |
| B63H 1/26 | (2006.01) |
| B63H 7/02 | (2006.01) |
| B63H 1/06 | (2006.01) |
| B63H 5/125 | (2006.01) |
| B64C 11/16 | (2006.01) |
| B64C 27/46 | (2006.01) |
| B64C 11/12 | (2006.01) |
| F01D 5/14 | (2006.01) |
| F03B 7/00 | (2006.01) |
| F03D 11/02 | (2006.01) |
| F04D 29/38 | (2006.01) |

(52) U.S. Cl. ..... 156/293; 156/305; 416/226; 416/132 B; 29/889.7

(58) Field of Classification Search .............. 156/60, 156/242, 245, 293, 294, 296, 304.1, 304.2, 156/304.3, 304.5, 305; 416/223 R, 226, 416/229 R, 230, 232, 233, 131, 132 R, 132 B; 29/889, 889.7, 889.71, 889.72
See application file for complete search history.

(56) References Cited

U.S. PATENT DOCUMENTS

| | | | |
|---|---|---|---|
| 4,474,536 A | 10/1984 | Gougeon et al. | |
| 2005/0214122 A1 | 9/2005 | Sorensen et al. | |
| 2006/0225278 A1* | 10/2006 | Lin et al. | 29/889.72 |
| 2007/0036659 A1* | 2/2007 | Hibbard | 416/233 |
| 2007/0253824 A1* | 11/2007 | Eyb | 416/223 R |
| 2008/0069699 A1 | 3/2008 | Bech | |
| 2008/0075603 A1 | 3/2008 | Breugel et al. | |
| 2008/0181781 A1* | 7/2008 | Livingston et al. | 416/223 R |
| 2009/0162208 A1* | 6/2009 | Zirin et al. | 416/226 |
| 2011/0091326 A1* | 4/2011 | Hancock | 416/225 |

FOREIGN PATENT DOCUMENTS

| | | | | |
|---|---|---|---|---|
| JP | 2003314431 A | * | 11/2003 | |
| JP | 2006123277 A | * | 5/2006 | |

* cited by examiner

*Primary Examiner* — Philip C Tucker
*Assistant Examiner* — Brian R Slawski
(74) *Attorney, Agent, or Firm* — Ann M. Agosti (57) ABSTRACT

A method of assembling a wind turbine blade comprises providing a first blade segment comprising at least two first spar cap segments; providing a second blade segment comprising at least two second spar cap segments; inserting the second blade segment into the first blade segment wherein a spar cap cavity is formed between each set of corresponding first and second spar cap segments; injecting an adhesive into the spar cap cavities to bond the blade segments together, wherein a scarf joint is formed between each set of corresponding first and second spar cap segments.

18 Claims, 8 Drawing Sheets

METHOD FOR ASSEMBLING JOINTED WIND TURBINE BLADE

FIELD OF THE INVENTION

This disclosure relates to a wind turbine blade and methods of assembly thereof.

BACKGROUND OF THE INVENTION

The subject matter disclosed herein relates generally to wind turbine blades, and more particularly, to a multi-segment wind turbine blade with at least two blade segments and a method of assembling the at least two blade segments.

Transporting lengthy wind turbine blades to a field site incurs significant costs. As the capacity of wind turbines increases, the lengths of the wind turbine blades also increase, further adding to difficulties and costs of transportation. Therefore, there is a need for a wind turbine blade comprising multiple blade segments and a method of assembling the blade segments. The blade segments can be transported to the field site at lower costs and assembled to form the wind turbine blade.

BRIEF SUMMARY OF THE INVENTION

In accordance with one embodiment disclosed herein, a method of assembling a wind turbine blade comprises providing a first blade segment comprising at least two first spar cap segments; providing a second blade segment comprising at least two second spar cap segments; inserting the second blade segment into the first blade segment wherein a spar cap cavity is formed between each set of corresponding first and second spar cap segments; injecting an adhesive into the spar cap cavities to bond the blade segments together, wherein a scarf joint is formed between each set of corresponding first and second spar cap segments.

In accordance with another embodiment disclosed herein, a kit for assembly of a wind turbine blade comprises a first blade segment comprising at least two first spar cap segments; a second blade segment comprising at least two second spar cap segments, wherein the second blade segment can be inserted into the first blade segment to form a spar cap cavity and a scarf joint between each set of corresponding first and second spar cap segments; and an adhesive for filling the spar cap cavities and bonding the first blade segment to the second blade segment.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
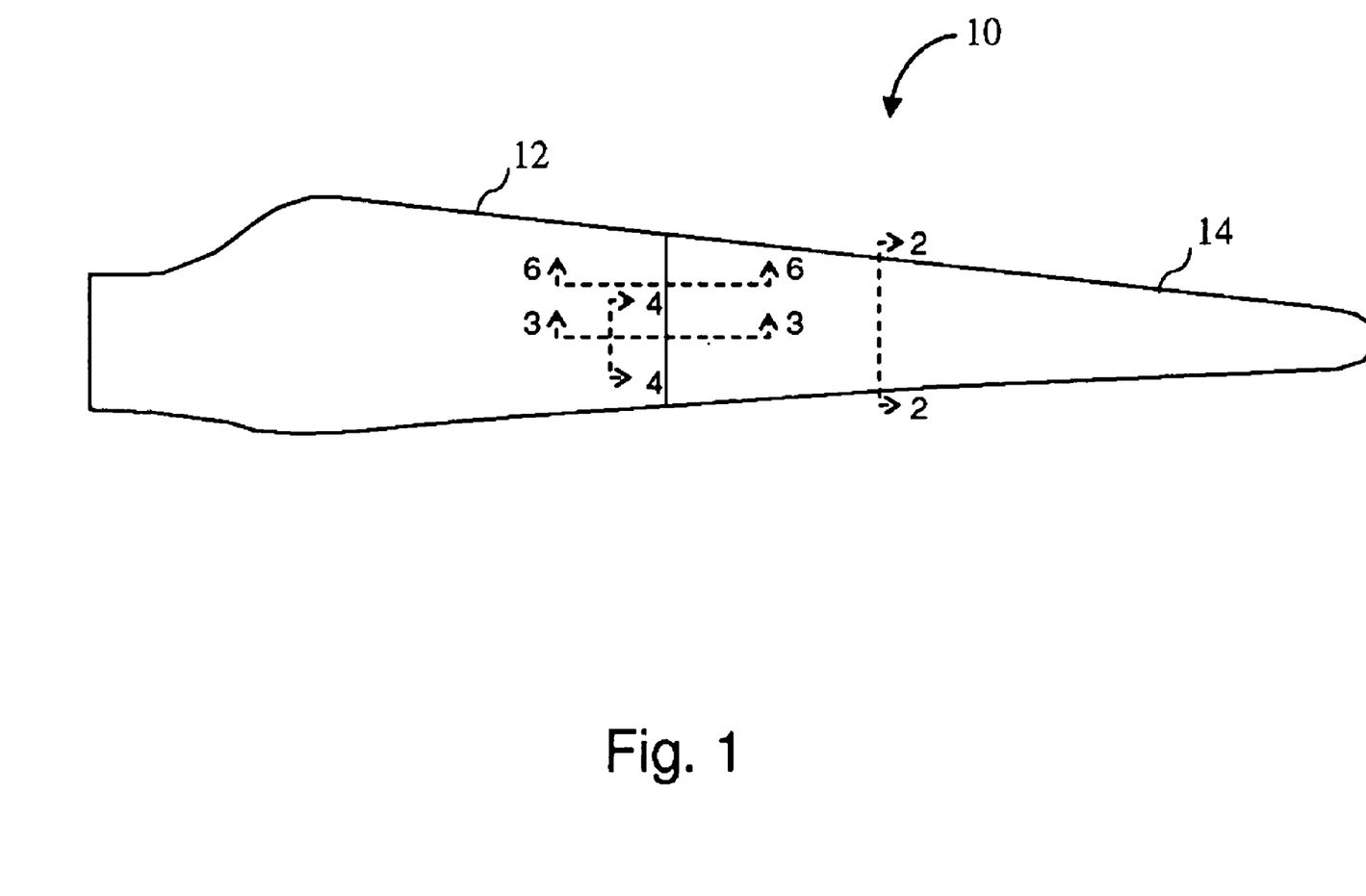
FIG. 1 illustrates a wind turbine blade in accordance with aspects disclosed herein.
Figure 2:
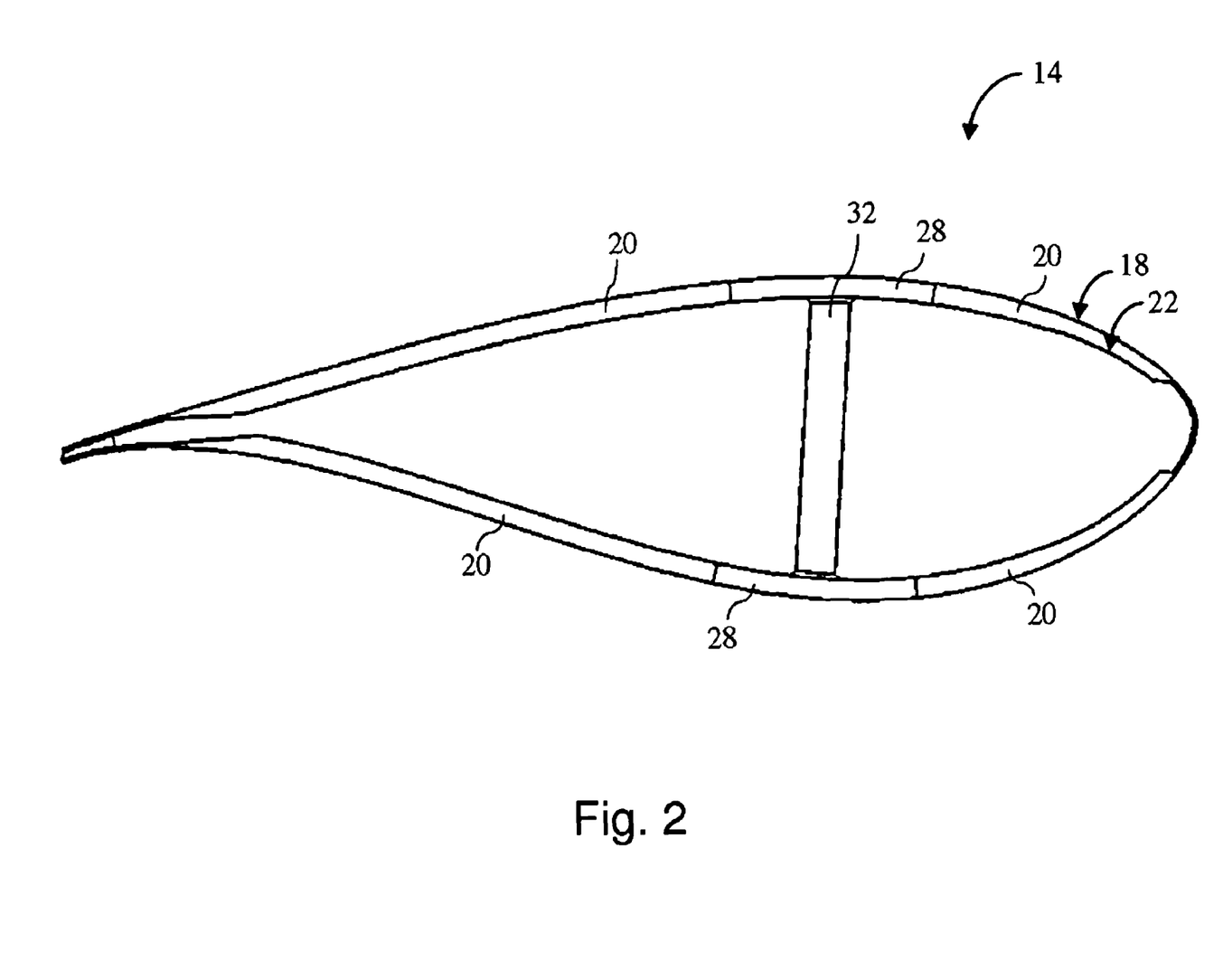
FIG. 2 illustrates a sectional view taken along line 2-2 in FIG. 1, in accordance with aspects disclosed herein.
Figure 3:
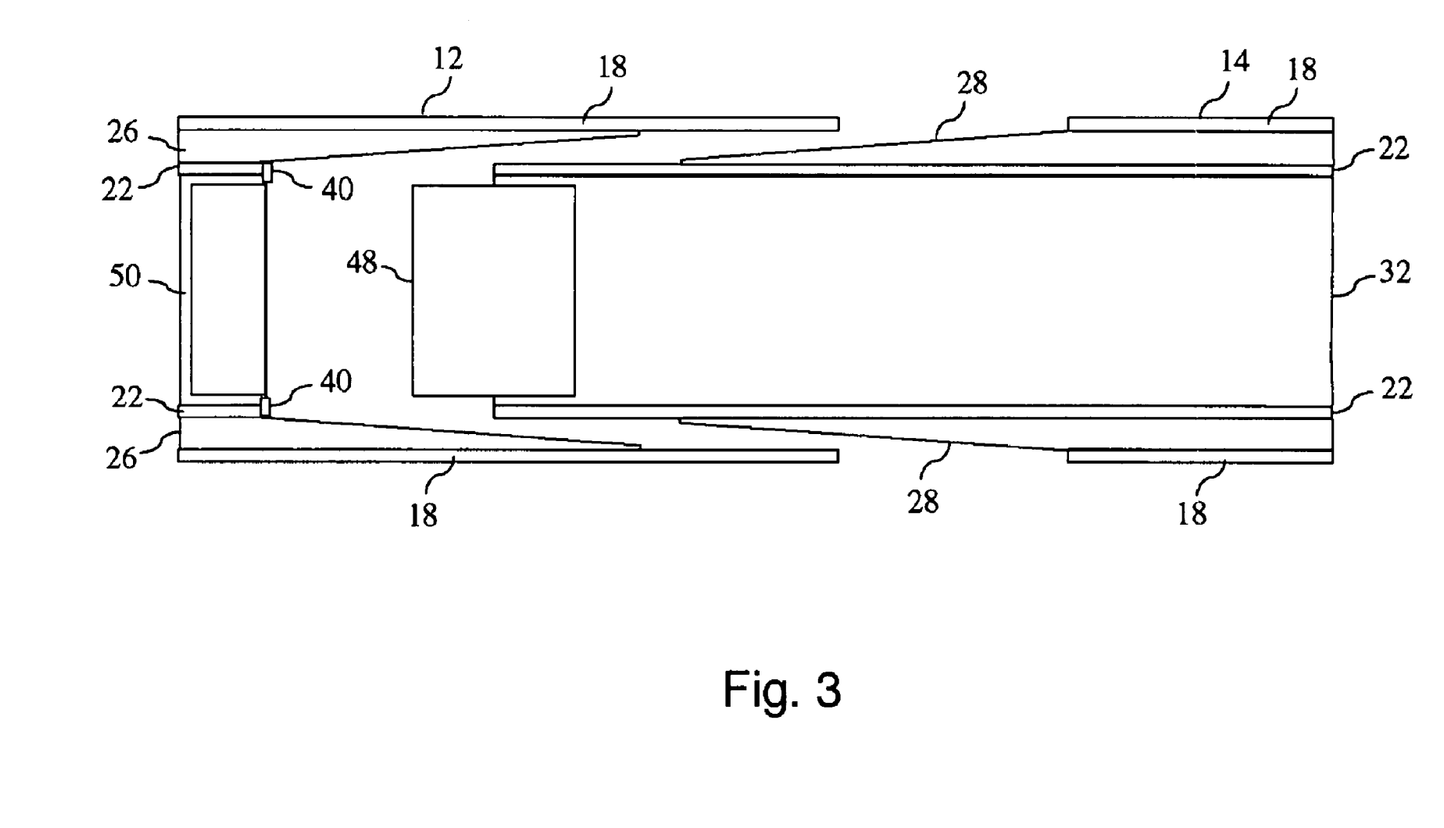
FIG. 3 is a sectional view taken along line 3-3 in FIG. 1 and illustrates a second blade segment being inserted into first blade segment in accordance with aspects disclosed herein.

Embodiments disclosed herein include methods of assembling a jointed wind turbine blade. The methods allow transport of blade components to a secondary site or field site where the components can be assembled to form the turbine blade. Referring to FIGS. 1, 2 and 3, a wind turbine blade 10 includes a first blade segment 12 and a second blade segment 14. The first and second blade segments 12 and 14 are each hollow segments comprising an outer skin 18, skin core 20, and inner skin 22. The outer skin 18, skin core 20, and inner skin 22 are made from materials that are light-weight and strong.

The first blade segment 12 includes at least two first spar cap segments 26, and the second blade segment 14 includes at least two second spar cap segments 28. The first and second spar cap segments are configured to form a scarf joint therebetween. A shear web 32 connects the first spar cap segments 26 in the first blade segment 12. Similarly, a shear web 32 connects the second spar cap segments 28 in the second blade segment 14. The spar cap segments bear longitudinal-loads experienced by the wind turbine blades and are attached to the inner skin 22 of the respective blade segments. In one embodiment, the outer skin 18 and spar cap segments 26 and 28 are comprised of composite glass or carbon, and the skin core 20 and shear web 32 are comprised of foam or balsa.

Figure 4:
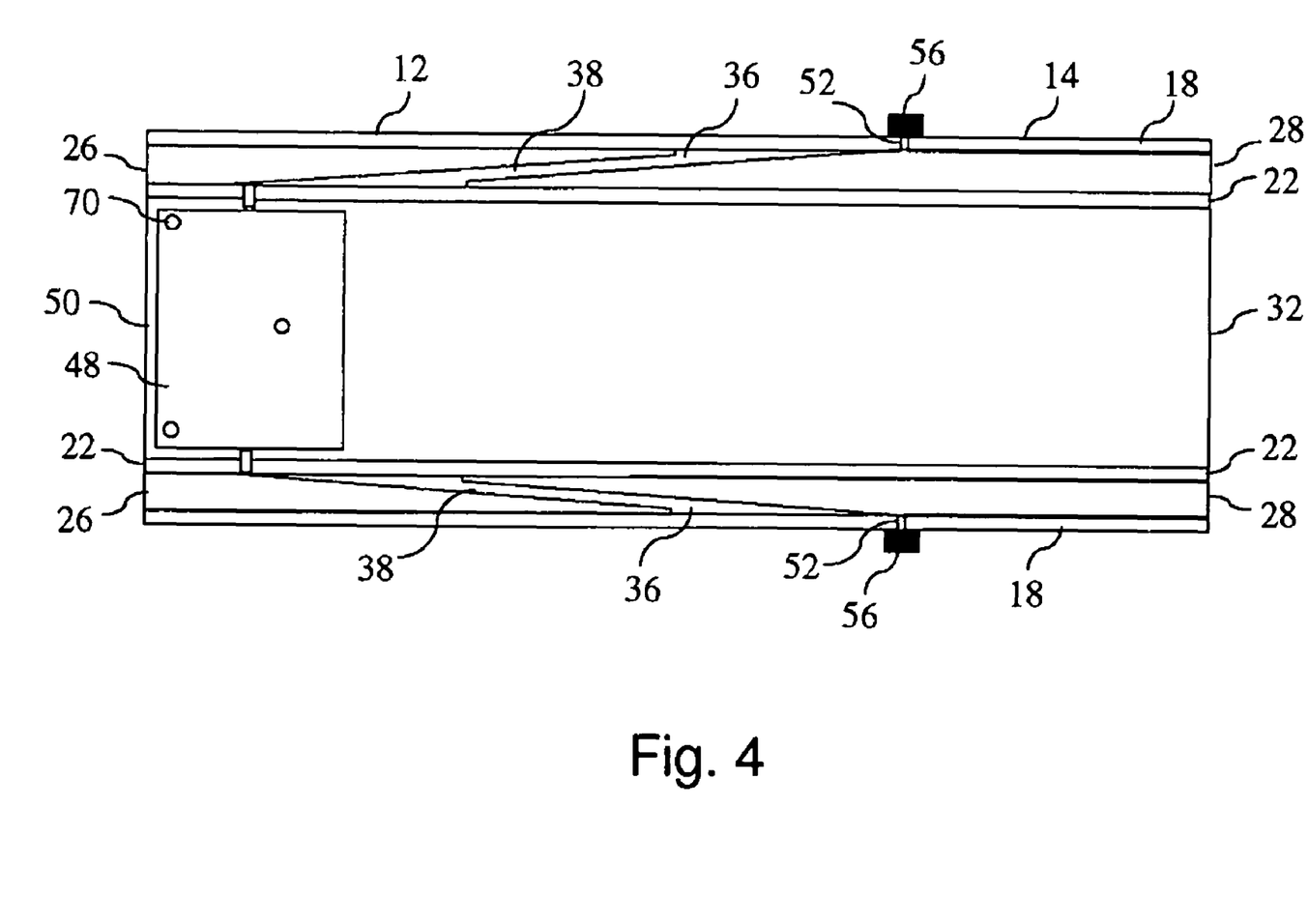
FIG. 4 is a sectional view taken along line 3-3 in FIG. 1 and illustrates a second blade segment fully inserted into a first blade segment in accordance with aspects disclosed herein.

As illustrated in FIGS. 3 and 4, the second blade segment 14 is inserted into the first blade segment 12 wherein a spar cap cavity 36 and scarf joint 38 are formed between each corresponding set of first and second spar cap segments 26 and 28. Prior to joining the first and second blade segments 12 and 14, at least one sealing pad 40 is attached to the first blade segment, wherein the sealing pad is located adjacent to a first spar cap segment 26. The inner skin 22 of the second blade segment 14 abuts against the sealing pad 40 when the second blade segment is inserted into the first blade segment 12, thereby sealing an interior surface of the spar cap cavity 36.

Figure 5:
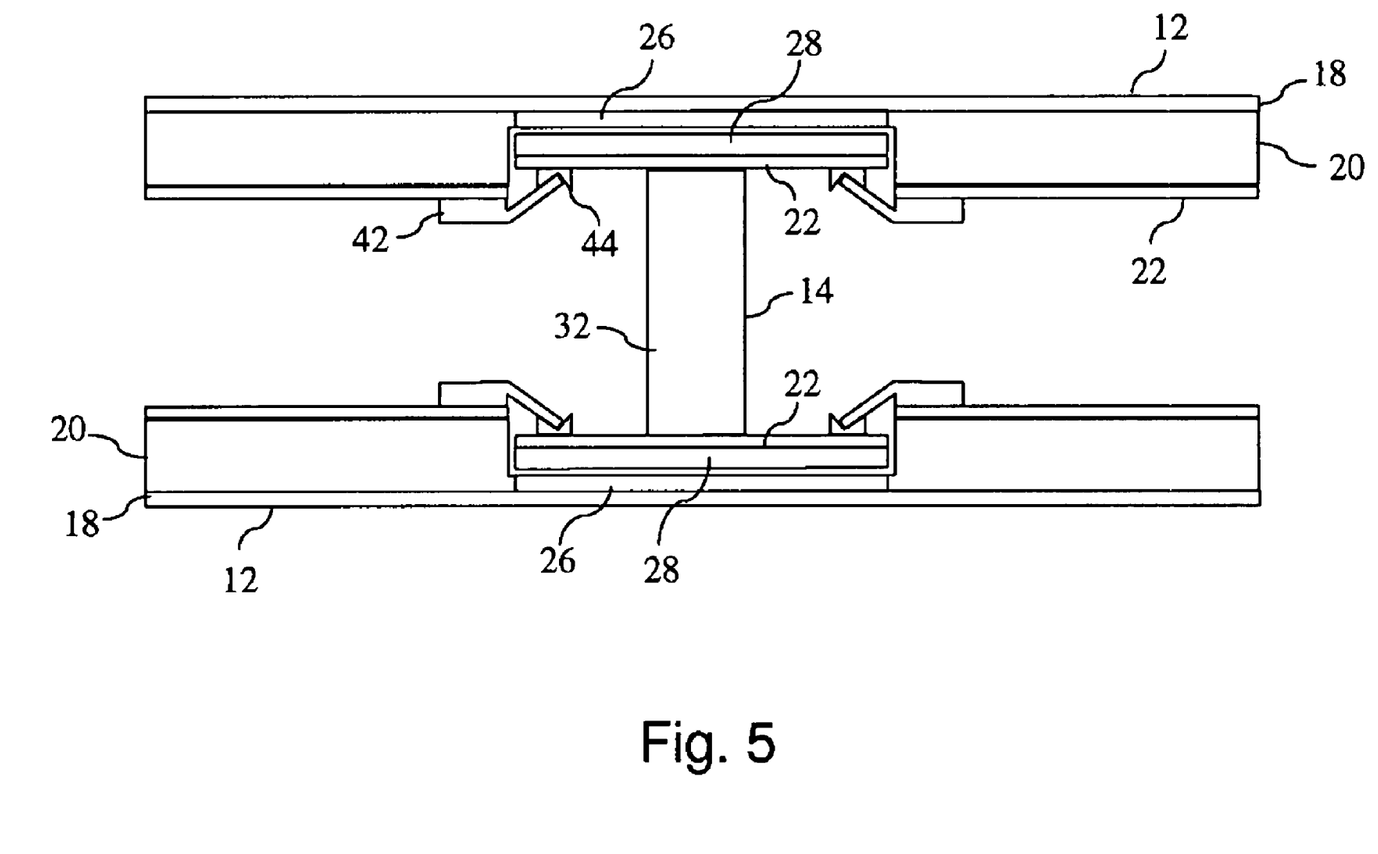
FIG. 5 is a sectional view taken along line 4-4 in FIG. 1 and illustrates sealing clips and sealing pads located on the blade segments in accordance with aspects disclosed herein.

Referring to FIG. 5, at least one sealing clip 42 is attached to the inner skin 22 of the first blade segment 12, and at least one sealing clip pad 44 is attached to the inner skin of the second blade segment 14. The sealing clip 42 will abut against a corresponding sealing clip pad 44, when the second blade segment 14 is inserted into the first blade segment 22, thereby sealing an interior surface of the spar cap cavity. The configuration of the sealing clip 42 and the sealing clip pad 44 can be modified, as long as the sealing clip engages that sealing clip pad to form a tight seal.

In one embodiment, a joint also exists in the shear web 32. For example, a butt joint may exist in the shear web 32 wherein a shear web doubler plate 48 is located on each side of the shear web. The shear web joint can have an alternate configuration, such as a scarf joint. The shear web doubler plates 48 are attached to the second blade segment 14 before joining the first and second blade segments together, as illustrated in FIG. 3 (only one shear web doubler plate 48 is shown). A shear web sealing pad 50 is attached to the first blade segment 12. When the second blade segment 14 is inserted into the first blade segment 12, the shear web doubler plates 48 abut against the shear web sealing pad 50, thereby positioning any free edges of the shear web doubler plates 48 against the shear web sealing pad 50. A shear web joint cavity (not shown) is formed between the shear web doubler plates 48.

Figure 6:
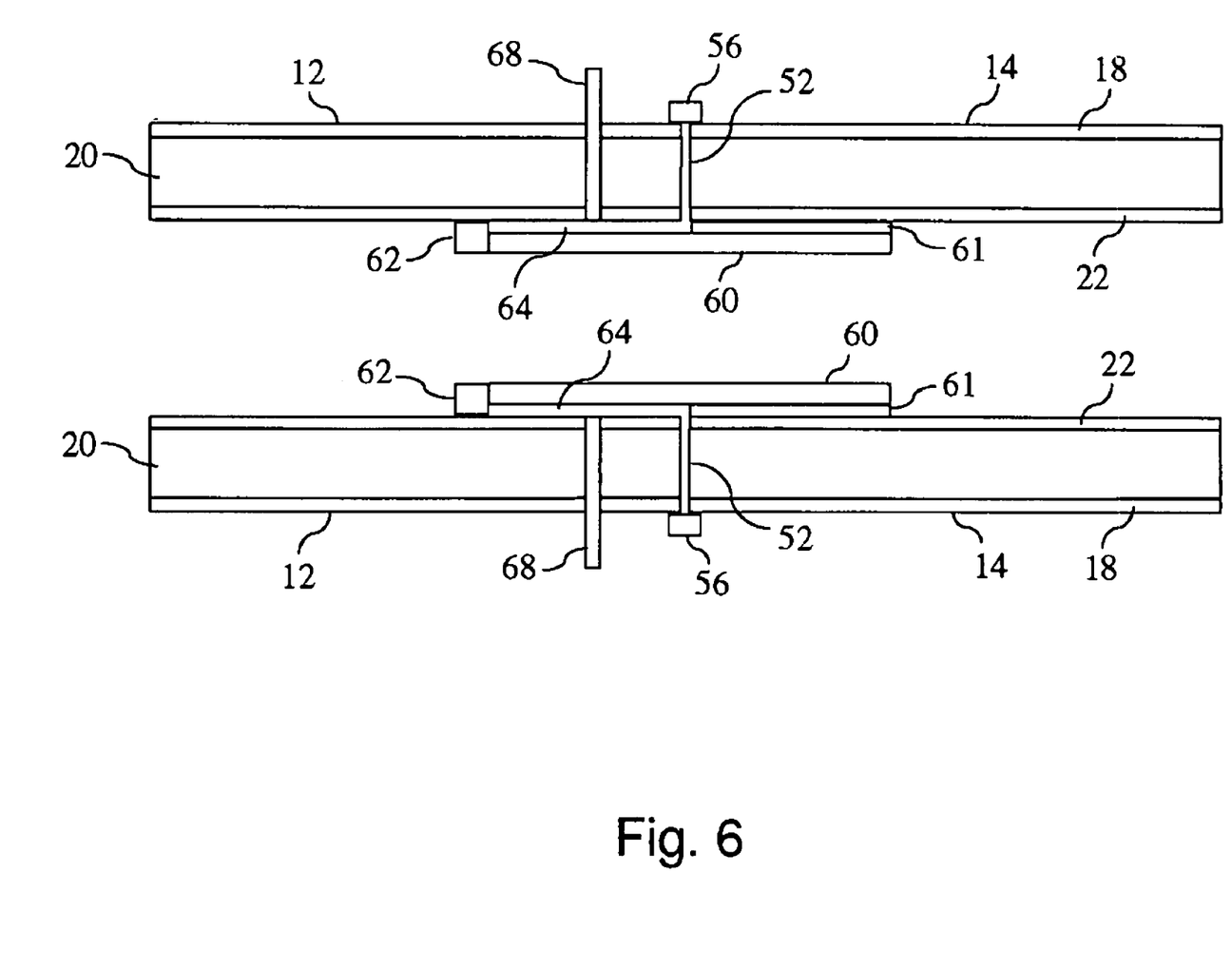
FIG. 6 is a sectional view taken along line 6-6 in FIG. 1 and illustrates a skin joint between the blade segments.

After the blade segments are positioned together, a skin joint 52 is formed between the outer skin 18, skin core 20, and inner skin 22 of the first blade 12 segment and the second blade segment 14, as illustrated in FIG. 4. In a preferred embodiment, the skin joint 52 is sealed with a skin joint seal 56 prior to injecting adhesive into the spar cap cavity 36. The skin joint 52 is sealed by any method known to those having skill in the art. In one embodiment, the skin joint seal 56 comprises foam or tape. Referring to FIG. 6, at least one skin joint doubler plate 60 can be attached to the inner skin 22 of the second blade segment 14 with a doubler plate adhesive 61. At least one doubler plate sealing pad 62 is attached to the inner skin 22 of the first blade segment 12. When the second blade segment 14 is inserted into the first blade segment 12, each skin joint doubler plate 60 abuts against a corresponding doubler plate sealing pad 62, wherein a skin joint cavity 64 is formed.

The sealing pads 40, 44, 50, 56 and 62 can be attached to the appropriate blade segment 12 and 14 by any method known to those having skill in the art. In one embodiment, the sealing pads are bonded to the blade segment with an adhesive. In a preferred embodiment, the sealing pads are comprised of foam, although other materials can be used that are suitable for forming a seal.

Figure 7:
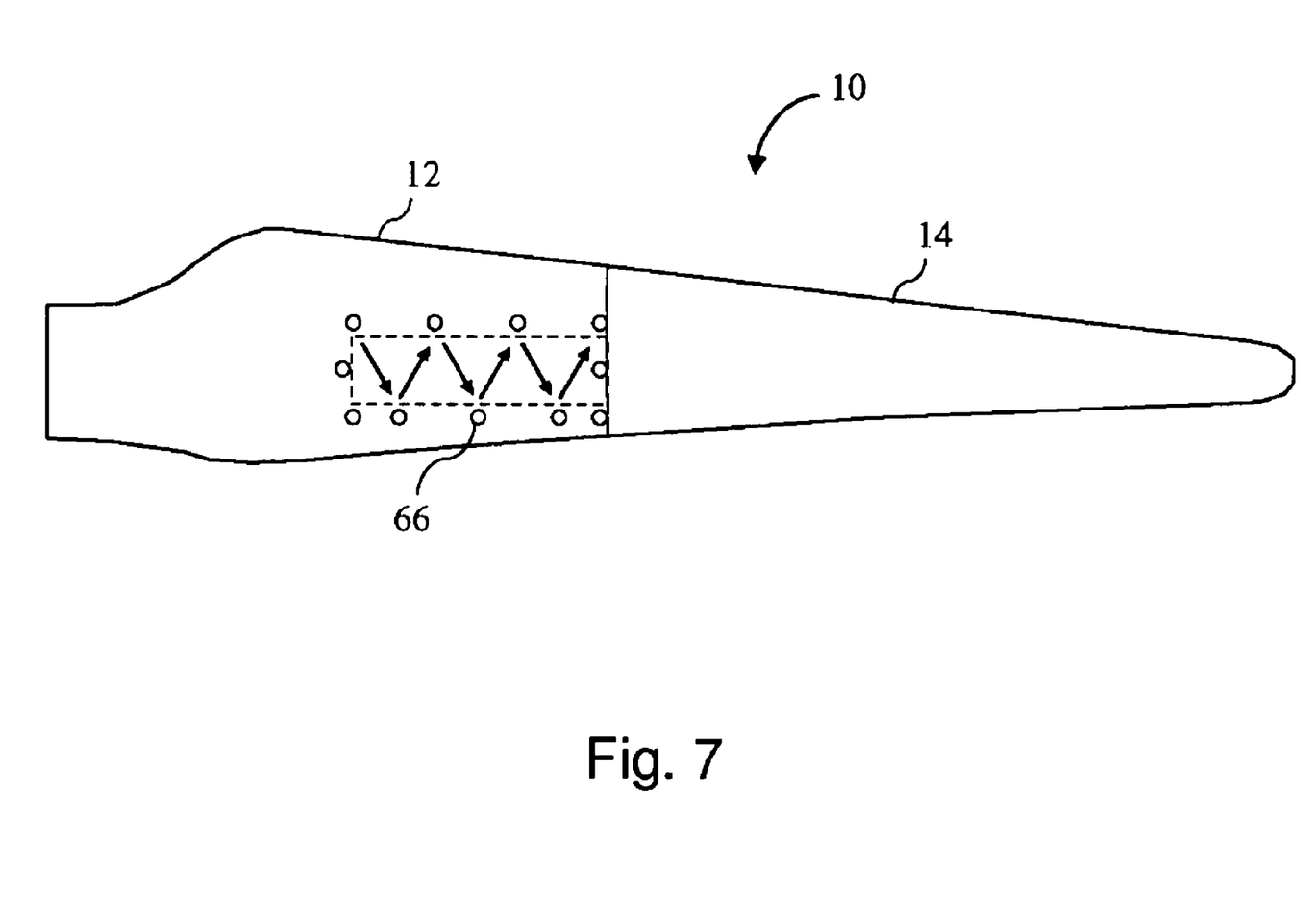
FIG. 7 illustrates a wind turbine blade comprising scar cap injection ports in accordance with aspects disclosed herein.
Figure 8:
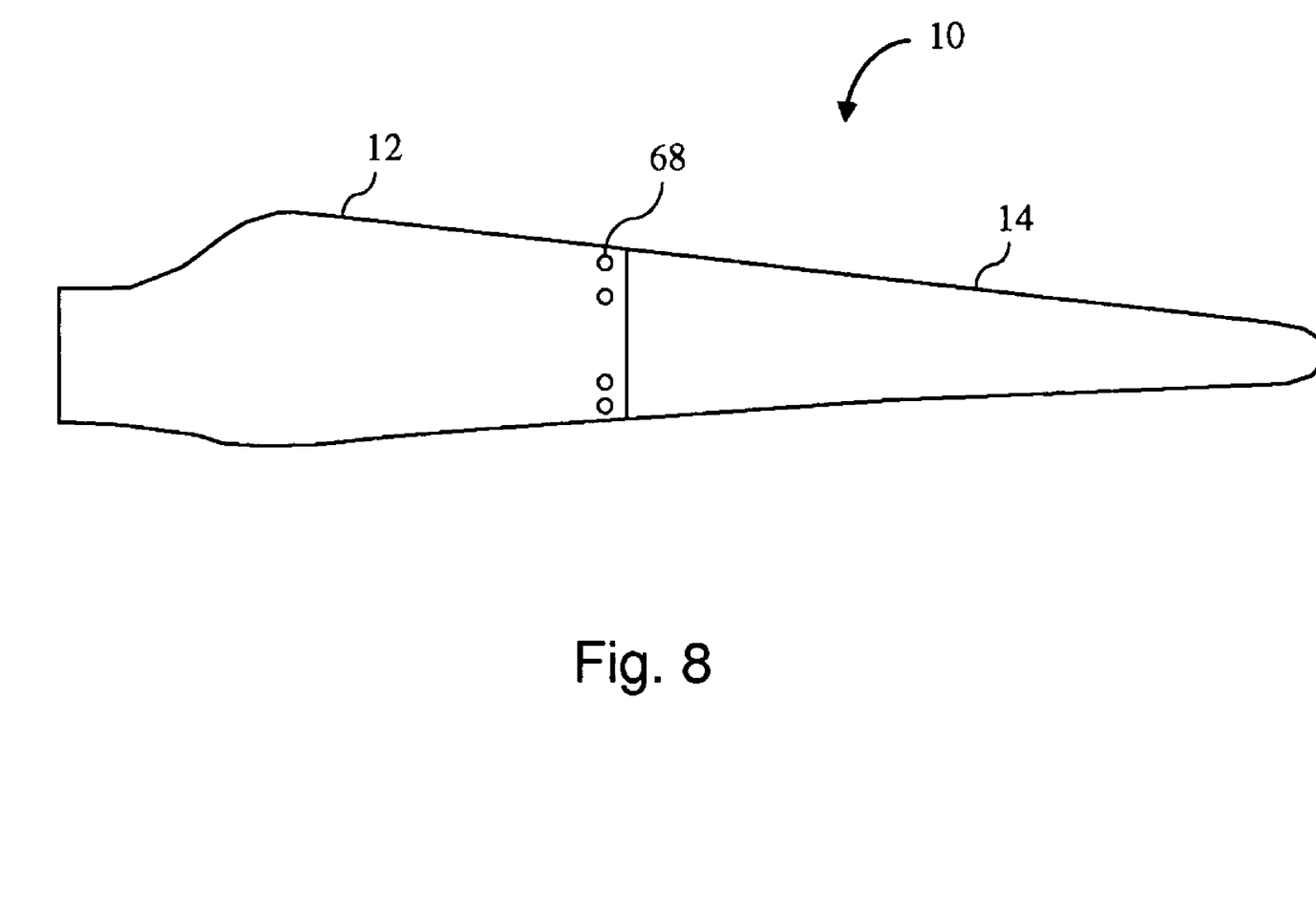
FIG. 8 illustrates a wind turbine blade comprising skin joint injection ports in accordance with aspects disclosed herein.

An adhesive is injected into the spar cap cavity 36, shear web joint cavity, skin joint 52 and skin joint cavity 64, after the second blade segment 12 is inserted into the first blade segment. As shown in FIG. 7, the adhesive is injected into the spar cap cavity 36 through spar cap injection ports 66 located in the first blade segment 12. The bonding of each first spar cap segment 26 to a second spar cap segment 28 forms a scarf joint between the first and second spar cap segments. In one embodiment, the injection of the adhesive begins at one end of the spar cap cavity 36 as illustrated in FIG. 7, and proceeds to the other end of the spar cap cavity until it is filled. The inner skin 22 and spar cap 28 of the second blade segment 14 may be stiffened to resist the adhesive injection pressure by using extra material in the inner skin and/or by using gussets along the length of the spar cap cavity 36. The skin joint cavity 64 is filled with adhesive through skin joint injection ports 68, as illustrated in FIG. 8. The shear web joint cavity, defined by shear web doubler plates 48, is filled with adhesive through shear web injection ports 70 (see FIG. 4). The injection ports 66, 68, and 70 also act as vents during the adhesive injection process.

In one embodiment, the adhesive comprises materials such as epoxies; urethanes, including polyurethane; cyclopentadienes, including dicyclopentadiene; methylmethacrylates; vinylesters; or polyesters. If necessary, the adhesive can be cured following the injection process using any curing method known to those having skill in the art.

All ranges disclosed herein are inclusive of the endpoints, and the endpoints are combinable with each other. The terms "first," "second," and the like as used herein do not denote any order, quantity, or importance, but rather are used to distinguish one element from another. The modifiers "about" and "approximately" used in connection with a quantity are inclusive of the stated value and have the meaning dictated by the context (e.g., includes the degree of error associated with measurement of the particular quantity). The use of the terms "a" and "an" and "the" and similar referents in the context of describing the invention (especially in the context of the following claims) are to be construed to cover both the singular and the plural, unless otherwise indicated herein or clearly contradicted by context.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of assembling a wind turbine blade, comprising:
    providing a first blade segment comprising at least two first spar cap segments;
    providing a second blade segment comprising at least two second spar cap segments;
    attaching at least one sealing pad to the first blade segment, wherein the sealing pad is attached adjacent to a first spar cap segment;
    inserting the second blade segment into the first blade segment wherein a spar cap cavity is formed between each set of corresponding first and second spar cap segments and wherein an inner skin of the second blade segment abuts against the sealing pad, thereby sealing an interior surface of the spar cap cavity; and
    injecting an adhesive into the spar cap cavities to bond the blade segments together, wherein a scarf joint is formed between each set of corresponding first and second spar cap segments.

2. The method of claim 1, further comprising:
    curing the adhesive.

3. The method of claim 1, wherein the first and second blade segments each comprise an outer skin, skin core, and inner skin and wherein a skin joint is formed between the first blade segment skin and the second blade segment skin when the first blade is inserted into the second blade, and the method further comprises:
    sealing the skin joint.

4. The method of claim 3, wherein the skin joint is sealed by attaching foam or tape to the joint.

5. The method of claim 1, further comprising:
    attaching at least one sealing clip to an inner skin of the first blade segment; and
    attaching at least one sealing clip pad to an inner skin of the second blade segment;
    wherein the at least one sealing clip abuts against a corresponding sealing clip pad when the second blade segment is inserted into the first blade segment, thereby sealing an interior surface of the spar cap cavity.

6. The method of claim 5, wherein the sealing clip pad is comprised of foam.

7. The method of claim 1, further comprising:
    attaching at least one shear web doubler plate to the second blade segment; and
    attaching at least one shear web sealing pad to the first blade segment;
    wherein the at least one shear web doubler plate abuts against a shear web sealing pad when the second blade segment is inserted into the first blade segment.

8. The method of claim 1, wherein the adhesive is injected into the spar cap cavities through at least one spar cap injection port located in the first blade segment.

9. The method of claim 1, further comprising:
attaching at least one skin joint doubler plate to an inner skin of the second blade segment; and
attaching at least one doubler plate sealing pad to an inner skin of the first blade segment;
wherein the at least one skin joint doubler plate abuts against a doubler plate sealing pad when the second blade segment is inserted into the first blade segment to form a skin joint cavity.

10. The method of claim 9, further comprising:
injecting an adhesive into the skin joint cavity.

11. The method of claim 1, wherein the adhesive comprises a material selected from the group consisting of epoxies, urethanes, cyclopentadienes, methylmethacrylates, vinylesters, and polyesters.

12. A kit for assembly of a wind turbine blade, comprising:
a first blade segment comprising at least two first spar cap segments;
at least one sealing pad attached to the first blade segment and located adjacent to each first spar cap segment;
a second blade segment comprising at least two second spar cap segments, wherein the second blade segment can be inserted into the first blade segment to form a spar cap cavity and a scarf joint between each set of corresponding first and second spar cap segments, wherein an inner skin of the second blade segment abuts against the at least one sealing pad, thereby sealing an interior surface of the spar cap cavity; and
an adhesive for filling the spar cap cavities and bonding the first blade segment to the second blade segment.

13. The kit of claim 12, further comprising:
at least one sealing clip attached to an inner skin of the first blade segment; and
at least one sealing clip pad attached to an inner skin of the second blade segment;
wherein the at least one sealing clip abuts against a corresponding sealing clip pad when the second blade segment is inserted into the first blade segment.

14. The kit of claim 13, wherein the sealing pad is comprised of foam.

15. The kit of claim 12, further comprising:
at least one shear web doubler plate attached to the second blade segment; and
at least one shear web sealing pad attached to the first blade segment;
wherein the at least one shear web doubler plate abuts against a shear web sealing pad when the second blade segment is inserted into the first blade segment.

16. The kit of claim 12, further comprising:
at least one spar cap injection port located in the first blade segment.

17. The kit of claim 12, further comprising
at least one skin joint doubler plate attached to an inner skin of the second blade segment; and
at least one doubler plate sealing pad attached to an inner skin of the first blade segment;
wherein the at least one skin joint doubler plate abuts against a doubler plate sealing pad when the second blade segment is inserted into the first blade segment to form a skin joint cavity.

18. The kit of claim 12, wherein the adhesive comprises a material selected from the group consisting of epoxies, urethanes, cyclopentadienes, methylmethacrylates, vinylesters, and polyesters.

\* \* \* \* \*